United States Patent [19]

Giametta

[11] Patent Number: 4,850,615
[45] Date of Patent: Jul. 25, 1989

[54] MULTI-PIPE TRAP ADAPTER

[76] Inventor: Joseph A. Giametta, 6912 Cheyenne St., Biloxi, Miss. 39532

[21] Appl. No.: 806,965

[22] Filed: Dec. 9, 1985

[51] Int. Cl.⁴ .......................... F16L 55/00; F16L 25/00
[52] U.S. Cl. ...................................... 285/12; 285/177; 285/331; 4/191
[58] Field of Search ...................... 4/661, 191, DIG. 7; 285/237, 12, 177, 331; 138/118, 109, 120

[56] References Cited

U.S. PATENT DOCUMENTS

| 2,423,462 | 7/1947 | Mercier | 285/237 X |
| 3,958,313 | 5/1976 | Rossborough | 285/237 X |
| 4,547,005 | 10/1985 | Soederhuyzen | 285/237 X |

FOREIGN PATENT DOCUMENTS

| 2216678 | 1/1973 | Fed. Rep. of Germany | 285/237 |
| 1444078 | 7/1976 | United Kingdom | 285/237 |
| 2012902 | 8/1979 | United Kingdom | 285/237 |

Primary Examiner—Henry J. Recla
Assistant Examiner—Edward Donovan

[57] ABSTRACT

The invention comprises of a flexible body (1) with a round entrance (2) made smaller than the trap to be introduced. It has a figure six connection to insure against leaks. As the device is pushed inside the drain pipe to be connected the hash (5) on the figure six will be pressed tightly against the inside of the drain pipe, while the lip (6) will fit snugly around the outside of pipe. When the device is pulled over thin walled pipe, there is groove (4) or stop and the reinforced end (3) and sealer to avoid leakage around outside of pipe. The entrance (1) being smaller than trap to be introduced will insure a tight leakless joint. This particular device is made to accommodate any trap. The trap does not have to be cut off when installed. And the device has nothing inside to obstruct any hair or grease that will be discharged and finally clog a drain line.

1 Claim, 2 Drawing Sheets

MULTI-PIPE TRAP ADAPTER

BACKGROUND OF THE INVENTION

The field of the invention pertains to the joining of sanitary waste traps to different types and sizes of drain pipes. This device is constructed as to allow the transfer of waste liquids from the fixture to the building drain.

The prior art consists of joining traps to the drain line with slip joint nuts to a threaded waste pipe line. When joining a trap to copper waste lines a solder joint has to be made. Lastly when joining a waste pipe to a PVC drain line a trap adapter has to be installed.

Since there are so many different types of connections there is a need for one specific connection that will do the job quickly and economically on all types of drain pipes.

The main objective of the apparatus is to join a tubular trap to pipes having different characteristics and diameters so as to form a definite tight connection.

BACKGROUND ART

With this device there is no more need for any more costly solder joints to join a trap to a copper waste line. Again in joining a trap to a PVC waste line a trap adapter has to be installed in the waste line protruding through the wall and, most of the time there is not enough room to neatly cover it with a deep escutcheon. With the multi-pipe trap adapter it can be quickly installed with no need for the trap adapter.

With this device, traps can be installed in close places where you can't even get a pipe wrench into to install the trap drain line.

SUMMARY

The invention has an entrance which is made of a flexible material curved round and at its inner extremities is smaller than the trap body that is engaged. The inner body of the device is constructed to allow the trap body to be easily pushed through. At the tail end of the device is a reinforced sealer which will also seal the trap or when pulled over thin walled pipe will seal the pipe.

The entire entrance of the device is shaped as a figure six. The device is inserted into the drain lines of different sizes and types of pipes. As it is inserted inside the drain pipe, the lip pulls over the outside with the inner tappered production of the figure six tightening against the inside of the pipe. On other thin walled diameter pipes the device simply pulls over the pipe and the reinforces seal at the tail end of the device seals the outside of the pipe. The outer body of the device in this case tends to stretch out letting the pipe seal against the inner ring of the figure six.

DESCRIPTION OF THE PREFERRED EMBODIMENTS

Figure 1:
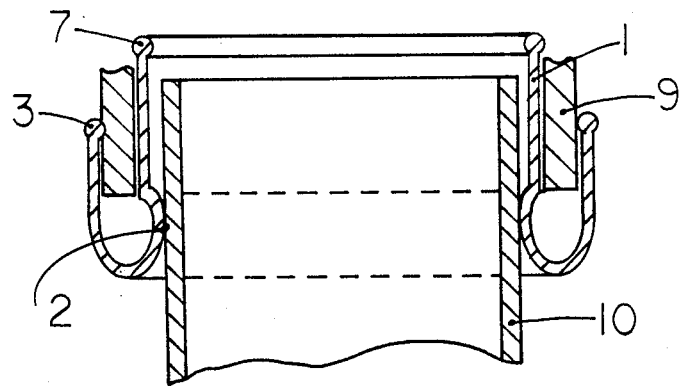
FIG. 1 is a cross section view of the entrance seal on a trap and inner seal and outer lip.

On FIG. 1 there is the body (1) made to fit inside of a drain line and also constructed as to allow a trap to be pushed into it. The inner entrance ring (2) is curved round and made smaller than the trap to be introduced. Also a reinforced end and sealer (7) made to a bead on the tail end of the body and on the outer lip (3).

Figure 2:
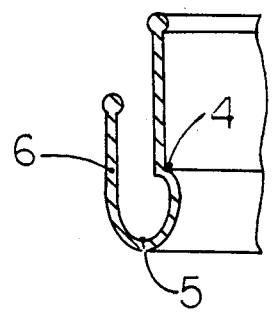
FIG. 2 is a cross section view of the figure six connection.

On FIG. 2 the annular abutment (4) just inside the entrance is a stop when pulled over thin walled pipe. The annular tapered projection (5) on the figure six connection is cupped and on a 45 degree angle facing toward the entrance of the device and when the adapter is pushed inside of a drain line tends to press tightly against the inside of the pipe making a seal.

Also the outer sealing ring (6) which is made with a gap smaller than the thickness of the pipe wall will fit snuggly against the outside of the pipe to be connected. This sealing ring also helps to keep the device in place. Since this device is used in conjunction with traps there is no need for any grippers to hold it on the drain line. The trap itself has slip joint nuts that will hold it in place at all times.

Figure 3:
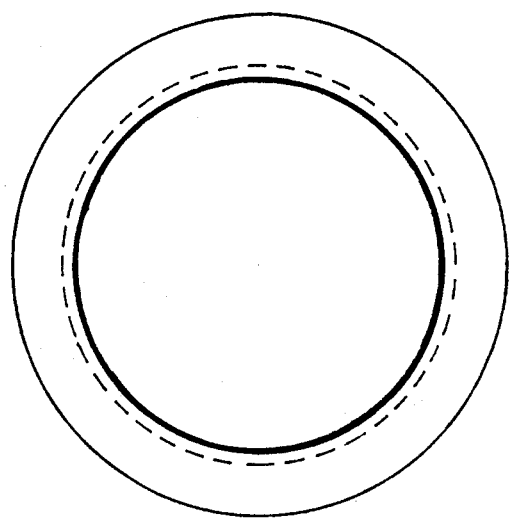
FIG. 3 is a plan view of the outer lip and trap entrance.

FIG. 3 shows the device on a plan view denoting the round body and outer sealing ring.

Figure 4:
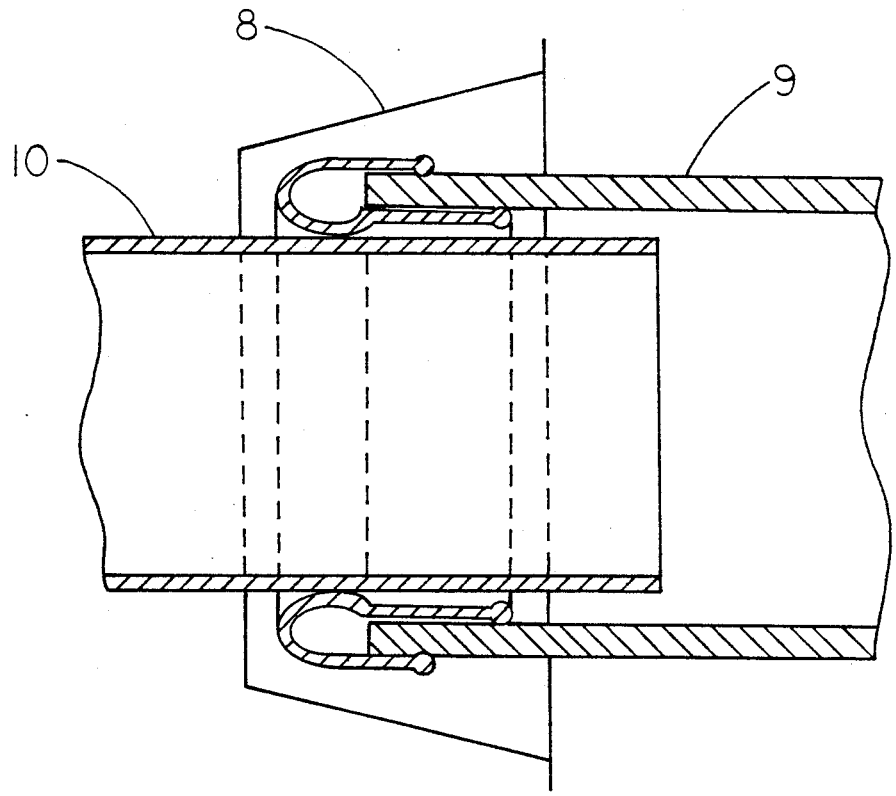
FIG. 4 is the device sealing a drain trap in the inner tubular member and a drain pipe in the outer tubular member surrounded by an escutcheon.

FIG. 4 shows the way the device will look when pushed inside drain pipes with a deep escutcheon covering the connection on the wall to make a neat appearance.

Figure 5:
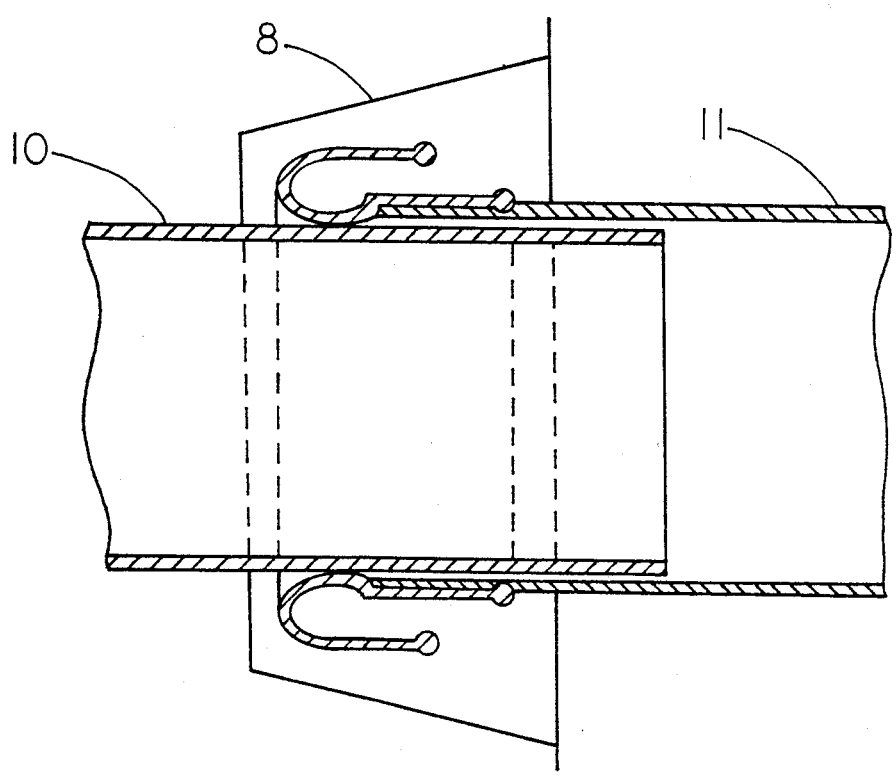
FIG. 5 is the device of FIG. 4 sealing a thin walled drain pipe in the inner tubular member.
Figure 1:
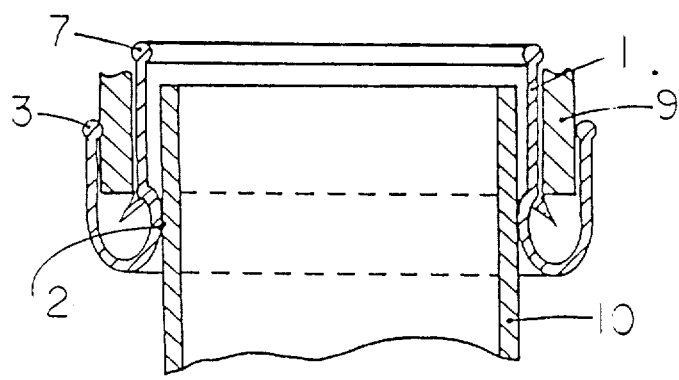
Figure 2:
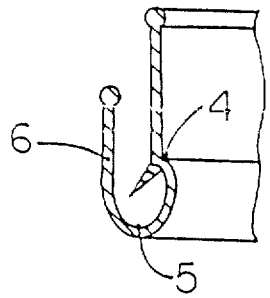
Figure 3:
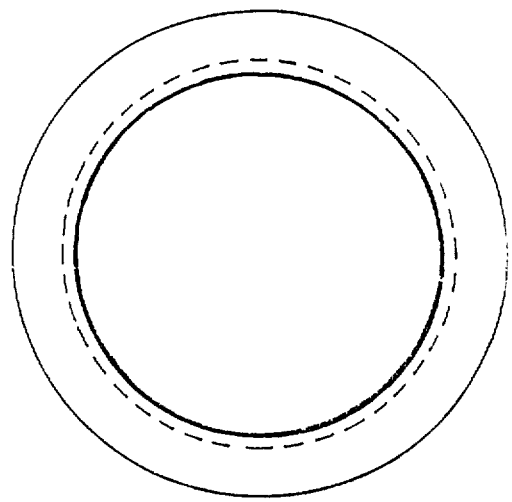
Figure 4:
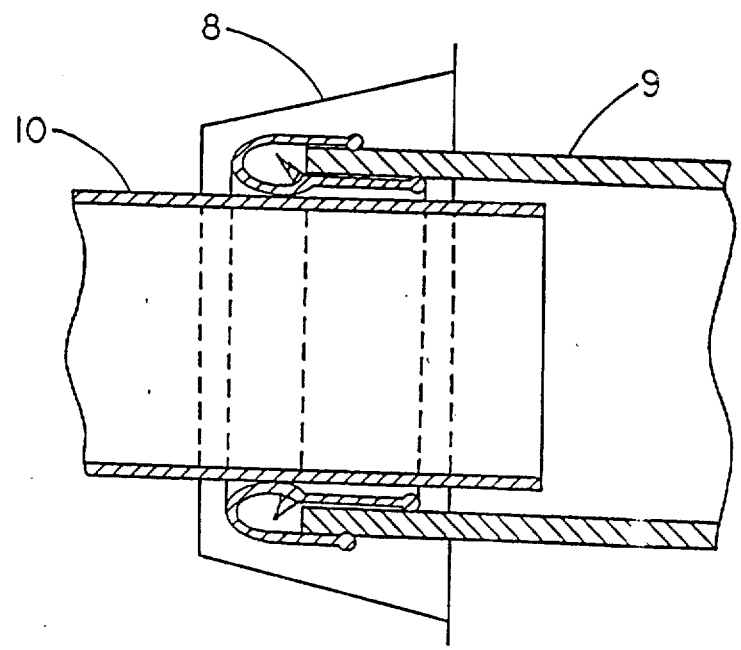
Figure 5:
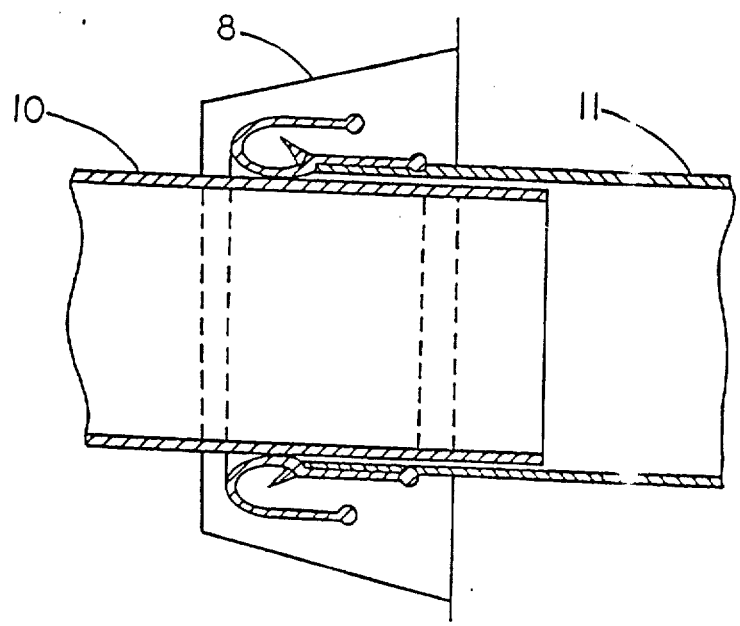

FIG. 5 indicates the way the device will look when pushed over thin walled pipe (11).

This invention will be instrumental in making a quick tight connection in inconvenient as well as convenient places.

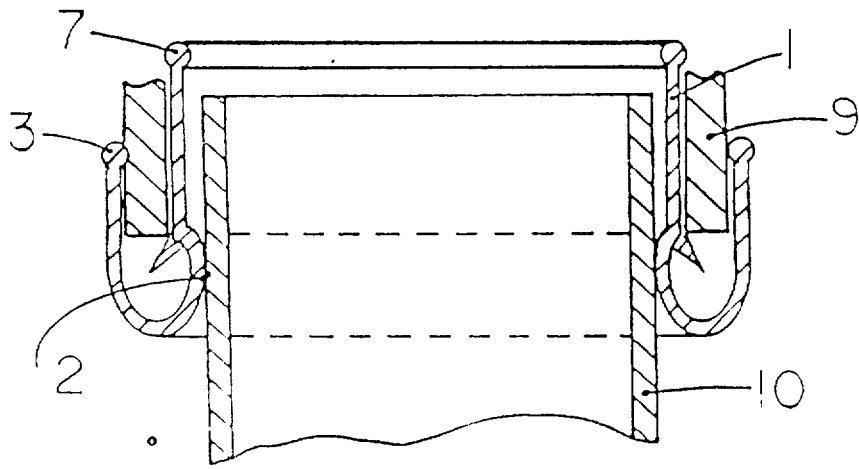

I claim:

1. An adapter for sealingly joining a waste trap having a standard diameter outlet to a drain pipe wherein the drain pipe may have one of several standard diameters which are greater than the diameter of said trap outlet, comprising:

a first tubular member having first and second ends, said first end terminating in a first annular sealing ring, the diameter of said first tubular member being greater than the diameter of said trap outlet but sized such that one of said drain pipes slightly larger than said trap outlet could slidably be inserted inside of said tubular member with said first sealing ring sealingly engaging the outer surface thereof, said second end terminating in a hollow entrance ring having an open side facing said first end of said tubular member, said hollow entrance ring having an inside diameter of a standard trap outlet such said trap outlet could slidingly be inserted therein with said hollow ring sealingly engaging the outer surface of said trap outlet;

a second tubular member having a first end connected to said hollow entrance ring and extending therefrom to surround said first tubular member such that an annular space is formed between said tubular members, said hollow ring and said second tubular member defining a contiguous inner surface, said second tubular member having a second end terminating in a second annular sealing ring, the diameter of said second tubular member being sized to accomodate other drain pipes of a diameter greater than the diameter of said first tubular member such that said other drain pipes could slidably be inserted into said second tubular member with said second annular sealing ring sealingly engaging the outer surface of said other drain pipes;

an annular tapered projection extending outwardly from the second end of said first tubular member adapted to sealingly engage an inside surface of said other drain pipes;

said hollow entrance ring and said second end of said first tubular member intersecting to form an annular abutment extending around the inside surface of said second end against which an end of said one of said drain pipes would abut when inserted into said first tubular member; and wherein said adapter is entirely made of flexible material.

* * * * *

UNITED STATES PATENT AND TRADEMARK OFFICE
CERTIFICATE OF CORRECTION

PATENT NO. : 4,850,615

DATED : July 25, 1989

INVENTOR(S) : Joseph A. Giametta

It is certified that error appears in the above-identified patent and that said Letters Patent is hereby corrected as shown below:

The title page should be deleted to appear as per attached title page.

The sheets of drawings consisting of figures 1-5 should be deleted to appear as per attached sheets.

Signed and Sealed this

Twenty-sixth Day of June, 1990

Attest:

HARRY F. MANBECK, JR.

Attesting Officer

Commissioner of Patents and Trademarks

United States Patent [19]

Giametta

[11] Patent Number: 4,850,615
[45] Date of Patent: Jul. 25, 1989

[54] MULTI-PIPE TRAP ADAPTER

[76] Inventor: Joseph A. Giametta, 6912 Cheyenne St., Biloxi, Miss. 39532

[21] Appl. No.: 806,965

[22] Filed: Dec. 9, 1985

[51] Int. Cl.[4] .......................... F16L 55/00; F16L 25/00
[52] U.S. Cl. ...................................... 285/12; 285/177; 285/331; 4/191
[58] Field of Search ...................... 4/661, 191, DIG. 7; 285/237, 12, 177, 331; 138/118, 109, 120

[56] References Cited

U.S. PATENT DOCUMENTS

| | | | |
|---|---|---|---|
| 2,423,462 | 7/1947 | Mercier | 285/237 X |
| 3,958,313 | 5/1976 | Rossborough | 285/237 X |
| 4,547,005 | 10/1985 | Soederhuyzen | 285/237 X |

FOREIGN PATENT DOCUMENTS

| | | | |
|---|---|---|---|
| 2216678 | 1/1973 | Fed. Rep. of Germany | 285/237 |
| 1444078 | 7/1976 | United Kingdom | 285/237 |
| 2012902 | 8/1979 | United Kingdom | 285/237 |

Primary Examiner—Henry J. Recla
Assistant Examiner—Edward Donovan

[57] ABSTRACT

The invention comprises of a flexible body (1) with a round entrance (2) made smaller than the trap to be introduced. It has a figure six connection to insure against leaks. As the device is pushed inside the drain pipe to be connected the hash (5) on the figure six will be pressed tightly against the inside of the drain pipe, while the lip (6) will fit snugly around the outside of pipe. When the device is pulled over thin walled pipe, there is groove (4) or stop and the reinforced end (3) and sealer to avoid leakage around outside of pipe. The entrance (1) being smaller than trap to be introduced will insure a tight leakless joint. This particular device is made to accommodate any trap. The trap does not have to be cut off when installed. And the device has nothing inside to obstruct any hair or grease that will be discharged and finally clog a drain line.

1 Claim, 2 Drawing Sheets